US008264471B2

(12) United States Patent
Martensson

(10) Patent No.: US 8,264,471 B2
(45) Date of Patent: Sep. 11, 2012

(54) MINIATURE CHARACTER INPUT MECHANISM

(75) Inventor: Joakim Martensson, Lund (SE)

(73) Assignee: Sony Mobile Communications AB, Lund (SE)

( * ) Notice: Subject to any disclaimer, the term of this patent is extended or adjusted under 35 U.S.C. 154(b) by 373 days.

(21) Appl. No.: 12/564,419

(22) Filed: Sep. 22, 2009

(65) Prior Publication Data

US 2011/0069012 A1 Mar. 24, 2011

(51) Int. Cl.
*G06F 3/041* (2006.01)
(52) U.S. Cl. ........................................................ 345/173
(58) Field of Classification Search .................. 345/173, 345/167; 379/406.05, 21; 455/420; 340/438
See application file for complete search history.

(56) References Cited

U.S. PATENT DOCUMENTS

| 7,450,111 B2 * | 11/2008 | Hietala et al. ................. 345/173 |
|---|---|---|
| 2006/0055662 A1 | 3/2006 | Rimas-Ribikauskas et al. |
| 2006/0227116 A1 | 10/2006 | Zotov et al. |
| 2007/0146340 A1 | 6/2007 | Webb |
| 2007/0152979 A1 | 7/2007 | Jobs et al. |
| 2008/0165149 A1 | 7/2008 | Platzer |
| 2008/0231601 A1 * | 9/2008 | Fyke et al. ..................... 345/167 |
| 2009/0125327 A1 * | 5/2009 | Peeters et al. ....................... 705/3 |
| 2009/0323925 A1 * | 12/2009 | Sweeney et al. ......... 379/406.05 |
| 2010/0042954 A1 * | 2/2010 | Rosenblatt et al. ............ 715/863 |
| 2010/0074415 A1 * | 3/2010 | Knudson et al. ................ 379/21 |
| 2010/0075655 A1 * | 3/2010 | Howarter et al. ............. 455/420 |
| 2010/0075656 A1 * | 3/2010 | Howarter et al. ............. 455/420 |
| 2010/0087241 A1 * | 4/2010 | Nguyen et al. .................. 463/17 |
| 2010/0306815 A1 * | 12/2010 | Emerson et al. .............. 725/134 |
| 2010/0321175 A1 * | 12/2010 | Gilbert .......................... 340/438 |

FOREIGN PATENT DOCUMENTS

| WO | WO 01/78238 | 10/2001 |
|---|---|---|
| WO | WO 2008/030976 | 3/2008 |

OTHER PUBLICATIONS

Notification of Transmittal of the International Search Report and the Written Opinion of the International Searching Authority, or the Declaration corresponding to PCT/IB2010/050991, mailed Nov. 9, 2010, 15 pages.
International Preliminary Report on Patentability issued in corresponding PCT application No: PCT/IB2010/050991, dated Feb. 23, 2012.
Foy, Laura, "TechFest: Back of Device Touch Input", http://on10net/blogs/laura/TechFest-Back-of-Device-Touch-input/ printed Sep. 22, 2009.
Written Opinion of International Preliminary Examining Authority issued in corresponding PCT application No: PCT/IB2010/050991, dated Dec. 12, 2011.

* cited by examiner

*Primary Examiner* — Fred Tzeng
(74) *Attorney, Agent, or Firm* — Snyder, Clark, Lesch & Chung, LLP

(57) ABSTRACT

A device includes a touch screen with a maximum of nine distinct touch areas, displays an input interface on the touch screen, where the input interface includes a scrollable character wheel, receives selections of characters from the character wheel, and displays the selected characters on the user interface. The receiving of selections includes detecting a scrolling up or down of the character wheel to position a character in a particular location, and detecting a pressing action on the character in the particular location. The input interface provides a way for a user to enter a phone number and place a call using only nine distinct touch areas.

20 Claims, 13 Drawing Sheets

MINIATURE CHARACTER INPUT MECHANISM

BACKGROUND

Many electronic devices provide an option to a user to enter characters. For example, a mobile communication device (e.g., a cell phone) may use an input device, such as a keypad or a touch screen for receiving user input. A keypad may send a signal to the device when a user pushes a button on the keypad. A touch screen may send a signal to the device when a user touches it with a finger or a pointing device, such as a stylus. When a user inputs characters, the characters may appear on a display device of the mobile device. Some electronic devices, such as mobile communication devices, may have limited space available for an input device and an output device. Given such a limitation, providing a way for users of such electronic devices to input characters may prove to be troublesome.

SUMMARY

According to one aspect, a device may include a touch screen; a memory to store a plurality of instructions; and a processor to execute instructions in the memory to display an input interface on the touch screen, where the input interface includes a scrollable character wheel, receive one or more selections of characters from the character wheel, and display the selected characters on the user interface.

Additionally, the user interface may further include control buttons, where the control buttons may include one or more of a save button that saves the selected characters in the memory, a delete button that deletes a last character of the selected characters, a call button that places a call using the selected characters, and a return button that terminates display of the user interface.

Additionally, the user interface may include a three by three grid of input fields.

Additionally, the scrollable character wheel may include characters of a telephone keypad.

Additionally, the receiving one or more selections of characters may include detecting a scrolling up or down the scrollable character wheel to position a character in a particular location; and detecting a pressing action on the character in the particular location.

Additionally, the detecting a scrolling up or down may include one of detecting a dragging motion, detecting a flicking motion, or detecting a sustained pressure motion.

Additionally, the dragging motion may scroll the scrollable character wheel by a first particular number of characters and the flicking motion may scroll the scrollable character wheel by a second particular number of characters.

Additionally, the processor may further detect a selection of one of the displayed selected characters to edit, based on a horizontal dragging motion associated with the displayed selected characters.

Additionally, the scrollable character wheel may include one or more character wheels, and where each of the one or more character wheels may include a subset of letters of an alphabet.

Additionally, the device may include a mobile communication device.

According to another aspect, a method, performed by an electronic device, may include providing, using a processor of the electronic device, a user interface on a touch screen of the electronic device, where the user interface includes a scrollable character wheel; receiving, using the processor, a selection of a character from the scrollable character wheel; and displaying, using the processor, the selected character in the user interface.

Additionally, the receiving a selection of a character may include detecting a scrolling up or down of the scrollable character wheel to position a character in a particular location; and detecting a pressing action on the character in the particular location.

Additionally, the detecting a scrolling up or down may include one of detecting a dragging motion, detecting a flicking motion, or detecting a sustained pressure motion.

Additionally, the receiving a selection of a character and displaying the selected character may be repeated multiple times to input a phone number into the electronic device.

Additionally, the user interface may include a call button, and the method may further include detecting a selection of the call button; and placing a telephone call using the entered phone number.

Additionally, the receiving a selection of a character and displaying the selected character may be repeated multiple times to display a set of displayed character, and the method may further include detecting a first horizontal dragging action associated with the displayed set of characters; detecting a selection of one of the displayed set of characters; detecting selection of a character from the scrollable character wheel to replace the selected one of the displayed set of characters; and detecting a second horizontal dragging action to resume entry of characters.

Additionally, the user interface may include a maximum of nine distinct touch areas.

Additionally, the scrollable character wheel may include multiple letter wheels, each of the multiple letter wheels including a subset of characters of an alphabet, and the method may further include detecting a horizontal dragging motion to select one of the letter wheels, the selected letter wheel becoming the scrollable character wheel.

Additionally, the input interface may include a character wheel icon and the receiving the selection of a character may include detecting a pressure applied to the character wheel icon; moving the scrollable character wheel while the pressure is applied to the character wheel icon; detecting that the pressure is no longer applied to the character wheel icon; stopping movement of the scrollable character wheel when the pressure is no longer applied to the character wheel icon; and detecting a pressing action on a character located in a particular position of the scrollable character wheel.

According to another aspect, a computer-readable medium, containing instructions executable by one or more processors of an electronic device, may include one or more instructions to provide a user interface on a touch screen of the electronic device, where the user interface includes a scrollable character wheel and a call button; one or more instructions to detect a scrolling up or down of the scrollable character wheel to position a character in a particular location; one or more instructions to detect a pressing action on the character in the particular location; one or more instructions to display the selected character in the user interface; one or more instructions to repeat the detecting a scrolling up or down, the detecting a pressing action, and the displaying the selected character multiple times, to receive a phone number; one or more instructions to detect a selection of the call button; and one or more instructions to place a telephone call using the entered phone number.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

Figure 1:
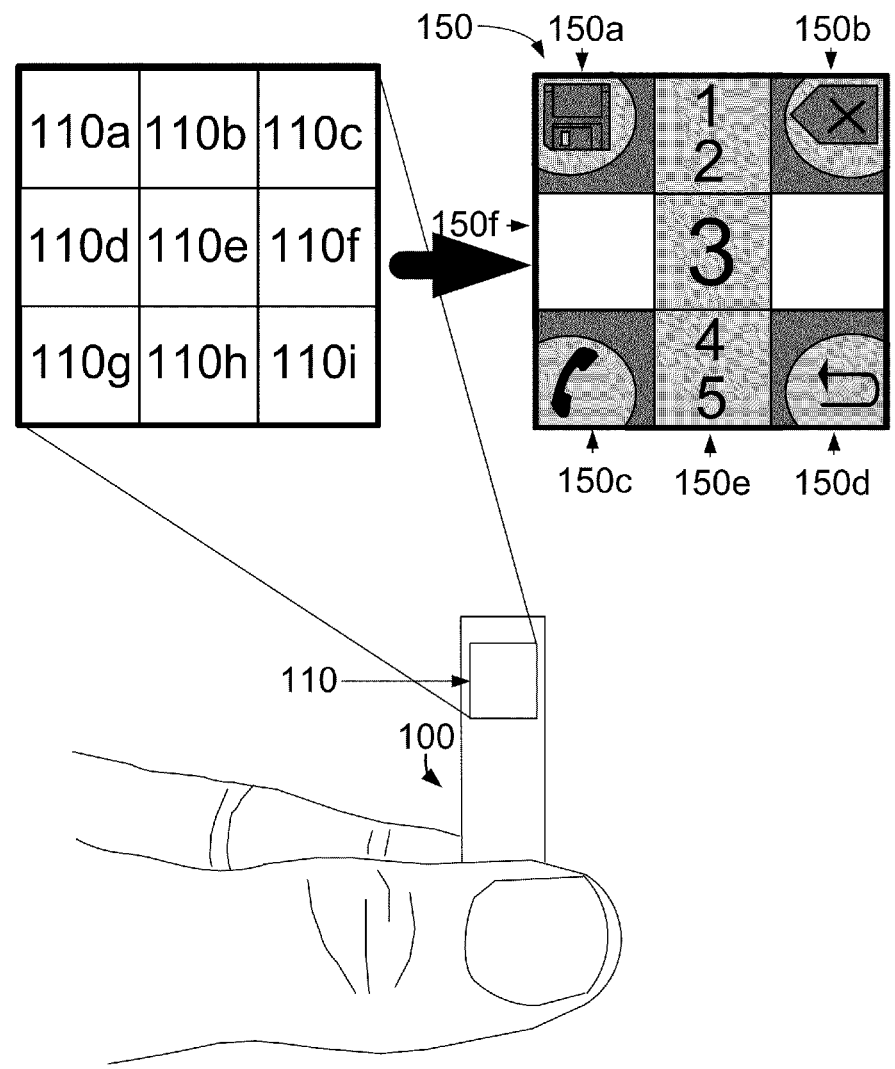
FIG. 1 is an overview diagram of a miniature character input mechanism described herein.

The following detailed description refers to the accompanying drawings. The same reference numbers in different drawings identify the same or similar elements. Also, the following detailed description does not limit the invention.

Exemplary implementations described herein may be described in the context of a mobile communication device (or mobile terminal). A mobile communication device is an example of a device that can employ input mechanisms described herein, and should not be construed as limiting of the types or sizes of devices or applications that can include the input mechanisms described herein. For example, the input mechanisms described herein may be used with other devices (e.g., electronic devices that may or may not include communication functions), such as a desktop device (e.g., a personal computer or workstation), a laptop computer, a personal digital assistant (PDA), a media playing device (e.g., an MPEG audio layer 3 (MP3) player, a digital video disc (DVD) player, a video game playing device), a remote control, a memory stick or another portable storage device, a household appliance (e.g., a microwave oven and/or appliance remote control), an automobile radio faceplate, a television, a computer screen, a point-of-sale terminal, an automated teller machine, an industrial device (e.g., test equipment, control equipment), a global positioning system (GPS) device, or any other device that may utilize an input device (e.g., the input mechanisms described herein).

When using a mobile communication device, users may enter characters using an input device of the mobile communication device. For example, a user may enter the digits of a phone number using a keypad or a touch screen. Touch screens (or touch displays) intended for finger inputs may be dependent on display size, because there may be a limit as to how close touch buttons may be placed next to each other on a screen before an error margin becomes too severe. An error margin may refer to the likelihood of the undesirable result of a user missing the intended button and pressing a neighboring button instead. Existing telephone keypads may include 12 keys (0, 1, 2, 3, 4, 5, 6, 7, 8, 9, *, and #). Additionally, there may be function keys, which may include a key to place a call, a key to delete characters, and a key to return to a previous screen. If all these functions are to be made available on a single screen, it may limit the minimum size of a corresponding touch screen.

Implementations described herein may provide a miniature character input mechanism for entering characters, such as when entering a phone number, in a device with a touch screen small enough to only accommodate a grid of three-by-three (e.g., nine) simultaneous touch areas (i.e. buttons). As an example, such a miniature character input mechanism may be incorporated in a small and stylish mobile phone, which may give priority to a small size over functionality. As another example, a miniature character input mechanism may be implemented in a device with multiple small parts, such as a mobile communication device with a headset and accessory cord, where the miniature character input mechanism may be implemented using a small control box located on the accessory cord.

Exemplary Device

FIG. 1 depicts an overview diagram of an exemplary miniature character input mechanism according to implementations described herein. As shown, a mobile communication device 100 may include a touch screen 110. Touch screen 110 may function as both an input device and an output device for mobile communication device 100. Touch screen 110 may be divided into an array of input fields 110a-110i. In other words, touch screen 110 may include a maximum of nine distinct touch areas to receive input from a user. The nine fields 110a-110i may not suffice for providing to a user an existing number keypad for entering characters. Such existing number keypads may require twelve characters and may therefore require twelve different input areas.

While the touch screen depicted in FIG. 1 and described herein includes a three-by-three array of fields 110a-110i, systems and methods described herein may be implemented with a touch screen of any number of fields. For example, a touch screen with a larger number of fields may be used, such as a touch screen with a four-by-four array of fields. Furthermore, the arrangement of the fields need not be a square arrangement, but may be, for example, a rectangular arrangement with a number of rows that differs from the number of columns. Moreover, fields 110a-110i need not represent indivisible input units of touch screen 110. In other words, fields 110a-110i may each include a smaller array of input fields.

Miniature character input mechanism may be implemented using fields 110a-11i via input interface 150. Input interface 150 may include control keys 150a-150d, number wheel 150e, and input row 150f. Control keys 150a-150d may implement control functions and may include a save button 150a, a delete button 150b, a call button 150c, and a return button 150d. Save button 150a may be used to store a number in memory, and may be implemented using field 110a. Delete button 150b may be used to delete the last character that was entered and that is displayed in input row 150f, and may be implemented using field 110c. Call button 150c may be used to call a number that is displayed in input row 150f, and may be implemented using field 110g. Return button 150d may be used to return to a previous screen, such as a main screen of device 100, or to close a phone call application that uses input interface 150. Return button 150d may be implemented using field 110i. Input interface 150 may include fewer or more control functions.

Number wheel 150e may be used to enter numbers. Number wheel 150e may display a column of numbers, with the number in the middle being the currently selected number (e.g., numeral '3' in FIG. 1). The currently selected number may be displayed in a larger font or otherwise highlighted, such with a bolder font or a different color. A user may move (or scroll) the number wheel up and down to select different numbers. In other words, number wheel 150e may be a scrollable character wheel. A user may move number wheel 150e using a dragging motion, a flicking motion, or by applying continuous pressure. When the user has selected the desired number, a user may enter the number by pressing on the middle of number wheel 150e. Number wheel 150e may be implemented using fields 110b, 110e, and 110h. Dragging or flicking motions across fields 110b, 110e, and 110h may be detected by the miniature character input mechanism to move number wheel 150e and select different numbers for input. Number wheel 150e may, for example, include all twelve characters of existing twelve key keypads, including a '0' character, a '1' character, a '2' character, a '3' character, a '4' character, a '5' character, a '6' character, a '7' character, a '8' character, a '9' character, a '*' star character, and a '#' pound character. Using number wheel 150e of input interface 150, a user may enter phone numbers using only three fields of touch screen 110. As the user moves (or scrolls) the number wheel, the numbers continuously rotate into the middle position. For example, as the user moves the number wheel, the numbers that appear in the middle field 110e may change from the currently displayed numeral '3' to '4,' then to '5,' and so on until '9,' followed by '*' and then '#,' then back to '0,' and so on.

Input row 150f (and field 110d) may display numbers that have been inputted by the user. Additionally, input row 150f may be used to drag the row of inputted numbers to the left or right to edit the row of inputted numbers. Thus, input interface 150 may provide a way for a user to enter a phone number and place a call using only nine distinct touch areas.

Figure 2:
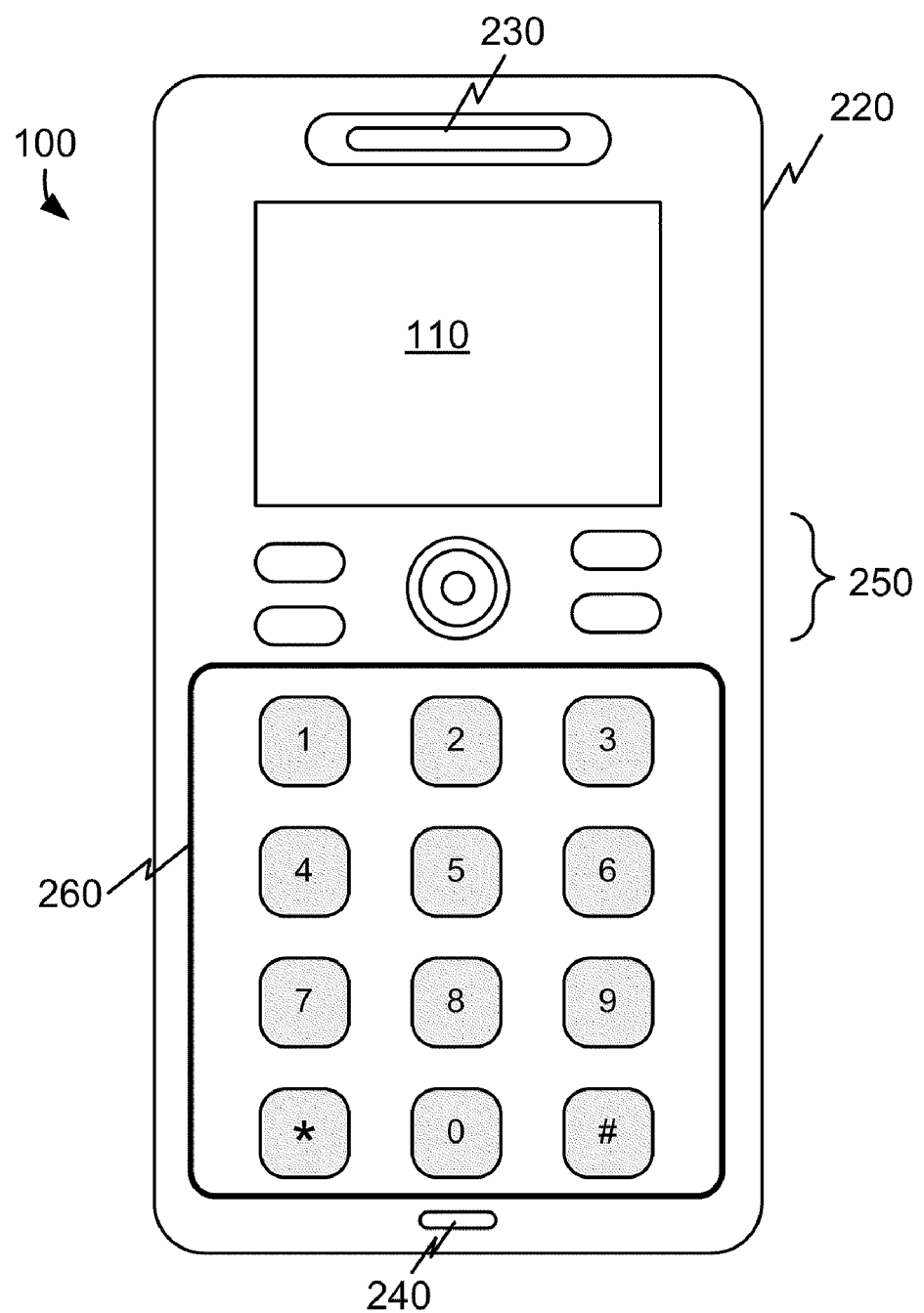
FIG. 2 is a diagram of an exemplary mobile communication device in which systems and/or methods described herein may be implemented.

FIG. 2 is a diagram of an exemplary mobile communication device 100 in which systems and/or methods described herein may be implemented. As shown, mobile communication device 100 may include a cellular radiotelephone with or without a multi-line display; a personal communications system (PCS) terminal that may combine a cellular radiotelephone with data processing, facsimile and data communications capabilities; a PDA that may include a radiotelephone, pager, Internet/Intranet access, Web browser, organizer, calendar and/or a global positioning system (GPS) receiver; a laptop and/or palmtop receiver; or other appliances that include a radiotelephone transceiver. Mobile communication device 100 may also include media playing capability. As described above, systems and/or methods described herein may also be implemented in other devices that require user input, with or without communication functionality.

Referring to FIG. 2, mobile communication device 100 may include touch screen 110, a housing 220, a speaker 230, a microphone 240, control buttons 250, and keypad 260

Touch screen 110 may provide visual information to the user. Touch screen 110 may be a color display, such as a red, green, blue (RGB) display, a monochrome display or another type of display. Touch screen 110 may include a touch sensor display that may be configured to receive a user input when the user touches touch screen 110. For example, the user may provide an input to touch screen 110 directly, such as via the user's finger, or via other input objects, such as a stylus. User inputs received via touch screen 110 may be processed by components and/or devices operating in mobile communication device 100. The touch screen may permit the user to interact with mobile communication device 100 in order to cause mobile communication device 100 to perform one or more operations. In one exemplary implementation, touch screen 110 may include a liquid crystal display (LCD) display. Touch screen 110 may include a driver chip (not shown) to drive the operation of touch screen 110.

Housing 220 may protect the components of mobile communication device 100 from outside elements. Housing 220 may include a structure configured to hold devices and components used in mobile communication device 100, and may be formed from a variety of materials. For example, housing 220 may be formed from plastic, metal, or a composite, and may be configured to support touch screen 110, speaker 230, microphone 240, control buttons 250, and keypad 260.

Speaker 230 may provide audible information to a user of mobile communication device 100. Speaker 230 may be located in an upper portion of mobile communication device 100, and may function as an ear piece when a user is engaged in a communication session using mobile communication device 100. Speaker 230 may also function as an output device for music and/or audio information associated with games, voicemails, and/or video images played on mobile communication device 100.

Microphone 240 may receive audible information from the user. Microphone 240 may include a device that converts speech or other acoustic signals into electrical signals for use by mobile communication device 100. Microphone 240 may be located proximate to a lower side of mobile communication device 100.

Control buttons 250 may permit the user to interact with mobile communication device 100 to cause mobile communication device 100 to perform one or more operations, such as place a telephone call, play various media, etc. For example, control buttons 250 may include a dial button, a hang up button, a play button, etc. Keypad 260 may include a telephone keypad used to input information into mobile communication device 100.

In an exemplary implementation, functionality of control buttons 250 and/or keypad 260 may be implemented via touch screen 110, and control buttons 250 and keypad 260 may not be present in mobile communication device 100. In another implementation, control buttons 250 and keypad 260 may be present and different control buttons and keypad elements may be implemented via touch screen 110 based on the particular mode in which mobile communication device 100 is operating. For example, when operating in a cell phone mode, functions associated with control buttons 250 and keypad 260 may be implemented using touch screen 110, instead of, or in addition to, the functions being implemented using control buttons 250 and keypad 260. For example, a telephone keypad and control buttons associated with dialing, hanging up, etc., may be displayed by touch screen 110 using input interface 150. In other modes, functions associated with control buttons 250 and/or keypad 260 may not be implemented using touch screen 110.

Figure 3:
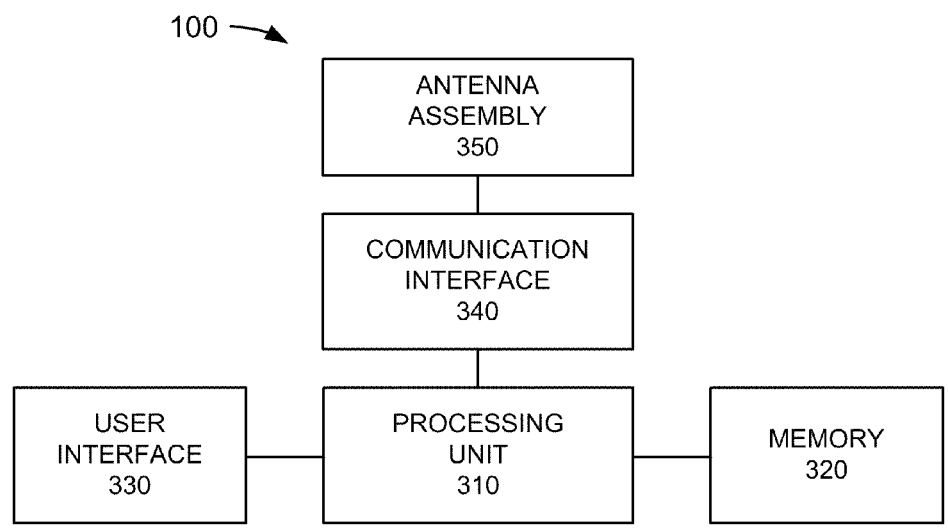
FIG. 3 is a diagram illustrating exemplary components of the mobile communication device of FIG. 2.

FIG. 3 illustrates a diagram of exemplary components of device 100. As shown in FIG. 3, mobile communication device 100 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or the like. Processing unit 310 may control operation of mobile communication device 100 and its components.

Memory 320 may include a random access memory (RAM), a read only memory (ROM), and/or another type of memory to store data and instructions that may be used by processing unit 310.

User interface 330 may include mechanisms for inputting information to mobile communication device 100 and/or for outputting information from mobile communication device 100. Examples of input and output mechanisms might include a speaker (e.g., speaker 230) to receive electrical signals and output audio signals; a camera lens to receive image and/or video signals and output electrical signals; a microphone (e.g., microphone 240) to receive audio signals and output electrical signals; buttons (e.g., a joystick, control buttons 250, or keys of keypad 260) to permit data and control commands to be input into mobile communication device 100; a display (e.g., touch screen 110) to output visual information; and/or a vibrator to cause mobile communication device 100 to vibrate.

Communication interface 340 may include any transceiver-like mechanism that enables mobile communication device 100 to communicate with other devices and/or systems. For example, communication interface 340 may include a modem or an Ethernet interface to a local area network (LAN). Communication interface 340 may also include mechanisms for communicating via a network, such as a wireless network. For example, communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 240 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

As described herein, mobile communication device 100 may perform certain operations in response to processing unit 310 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIGS. 2 and 3 shows exemplary components of mobile communication device 100, in other implementations, mobile communication device 100 may contain fewer, different, additional, or differently arranged components than depicted in FIGS. 2 and 3. In still other implementations, one or more components of mobile communication device 100 may perform one or more other tasks described as being performed by one or more other components of mobile communication device 100.

Mobile communication device 100 may provide a platform for a user to make and receive telephone calls, send and receive electronic mail or text messages, play various media, such as music files, video files, multi-media files, or games, and execute various other applications. Mobile communication device 100 may perform these operations in response to processing unit 310 executing sequences of instructions contained in a computer-readable storage medium, such as memory 320. Such instructions may be read into memory 320 from another computer-readable medium or another device via, for example, communication interface 340. In alternative embodiments, hard-wired circuitry may be used in place of or in combination with software instructions to implement processes described herein. Thus, implementations described herein are not limited to any specific combination of hardware circuitry and software.

Figure 4:
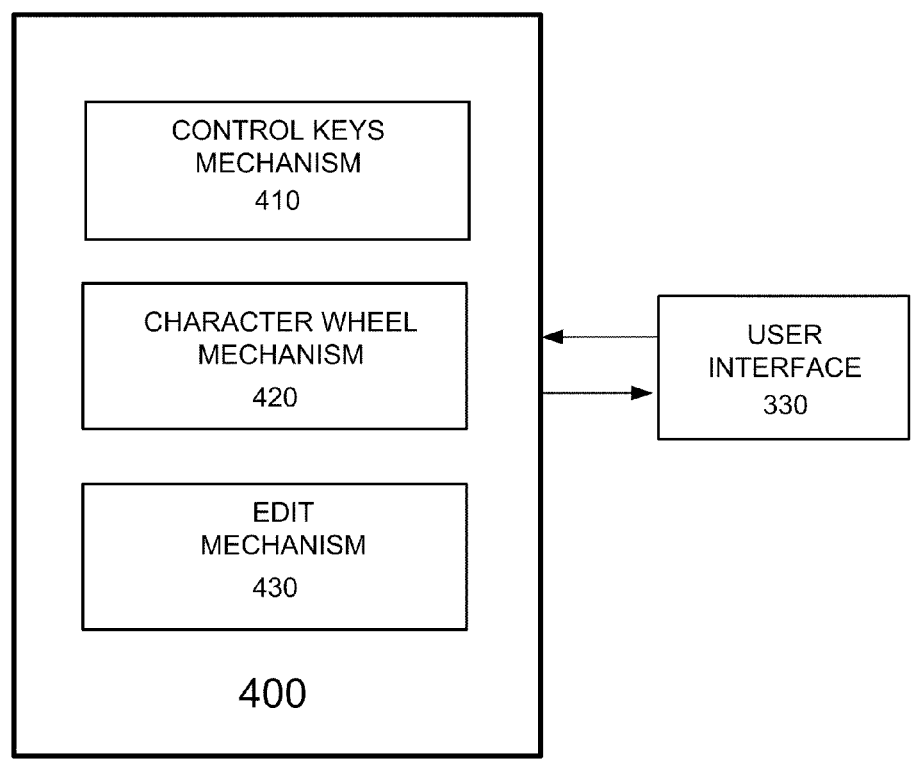
FIG. 4 is a diagram of exemplary components of a miniature character input mechanism described herein.

FIG. 4 is a diagram of exemplary components of a miniature character input mechanism 400. Miniature character input mechanism 400 may send and receive signals to and from user interface 330. For example, touch screen 110 may be part of user interface 330 and miniature character input mechanism 400 may receive signals from and send signals to touch screen 110. Miniature character input mechanism 400 may receive input from user interface 330, process the input, and provide output, based on the input, to user interface 330. In one implementation, miniature character input mechanism 400 may include a control keys mechanism 410, a character wheel mechanism 420, and an edit mechanism 430. In another implementation, miniature character input mechanism 400 may include more or fewer components. Miniature character input mechanism 400 may be implemented via processing unit 310 executing instructions stored in memory 320.

Miniature character input mechanism 400 may present an interface that allows a user to activate functions implemented by the miniature character input mechanism. For example, miniature character input mechanism 400 may present user interface 150 on touch screen 110, and detect activation of one or more of fields 110a-110i of touch screen 110. For example, a user may touch control buttons 150a-150d of user interface 150 or manipulate number wheel 150e (or another character wheel) or input row 150f using a finger or a stylus by pressing on one or more of fields 110a-110i, or by executing a dragging or a flicking movement across one or more of fields 110a-110i.

In response to detecting a user action, miniature character input mechanism 400 may determine a type of user action and activate one or more mechanisms. Miniature character input mechanism 400 may activate control keys mechanism 410, character wheel mechanism 420, or edit mechanism 430.

In response to detecting that the user has activate a control key, miniature character input mechanism 400 may activate control keys mechanism 410. For example, a user may press on any one of control buttons 150a-150d, such as save button 150a, delete button 150b, call button 150c, or return button 150d. Control keys mechanism 410 may implement a particular function of a control button or may communicate to another component of mobile communication device 100 that a control button was activated. For example, if a user activates save button 150a, control keys mechanism 410 may send a signal to a component and/or application of mobile communication device 100 that manage contacts stored in mobile communication device 100. The actual storing of a phone number, which was entered by the user, may be performed by the particular component and/or application that manage the contacts. If a user activates delete button 150*b*, control keys mechanism 410 may activate a function to delete the last character entered and displayed in input row 150*f*. The function to delete the character may be implemented directly by control keys mechanism 410. Similarly, if a user activates call button 150*c*, control keys mechanism 410 may send a signal to a component and/or application of mobile communication device 100 which manages the placement of calls, and if a user activates return button 150*d*, control keys mechanism 410 may terminate or pause operation of miniature character input mechanism 400 by returning to a previous application and/or user interface of mobile communication device 100 and may cease display of user interface 150.

In response to detecting that the user has activated a character wheel (e.g., number wheel 150*e*), miniature character input mechanism 400 may activate character wheel mechanism 420. For example, a user may contact number wheel 150*e* by pressing on, dragging across, or flicking across any of fields 110*b*, 110*e*, and 110*h* of touch screen 110. Character wheel mechanism 420 may perform functions based on user interaction with number wheel 150*e*. If the user moves number wheel 150*e* up or down by dragging up or down number wheel 150*e*, or flicking up or down number wheel 150*e*, character wheel mechanism 420 may change the appearance of number wheel 150*e* by moving number wheel 150*e* in accordance with the user's motion. If a user presses on the number currently displayed in the center of user interface 150, corresponding to the number currently selected, character wheel mechanism 420 may enter the selected number and may display the selected number in input row 150*f*.

Additionally, a user interface may include more than one character wheel. For example, a user interface may include three character wheels that together include the letters of the alphabet. If a user interface includes more than one character wheel, character wheel mechanism 420 may detect that a user is dragging (or sliding) a finger horizontally across an input interface to position a different character wheel into the middle row of the user interface. In response, character wheel mechanism 420 may change the appearance of the user interface to reflect such a user action.

In response to detecting that the user has interacted with displayed characters (e.g., input row 150*f*), miniature character input mechanism 400 may activate edit mechanism 430. For example, a user may drag the row of numbers being displayed in input row 150*f* to the left or right. Edit mechanism 430 may perform functions based on user interaction with input row 150*f*. For example, if a user drags the row of numbers displayed in input row 150*f* to the right, edit mechanism 430 may move the row of displayed numbers to the right to highlight a particular number. A user may change a particular number that has been highlighted by pressing on the number wheel. Edit mechanism 430 may receive the input from character wheel mechanism 420 and may replace the highlighted number with the newly entered number. A user may subsequently slide the row of displayed numbers back to the left, to resume entry of numbers. In response, edit mechanism 430 may move the row of numbers back to the left.

Exemplary Processes

Figure 5:
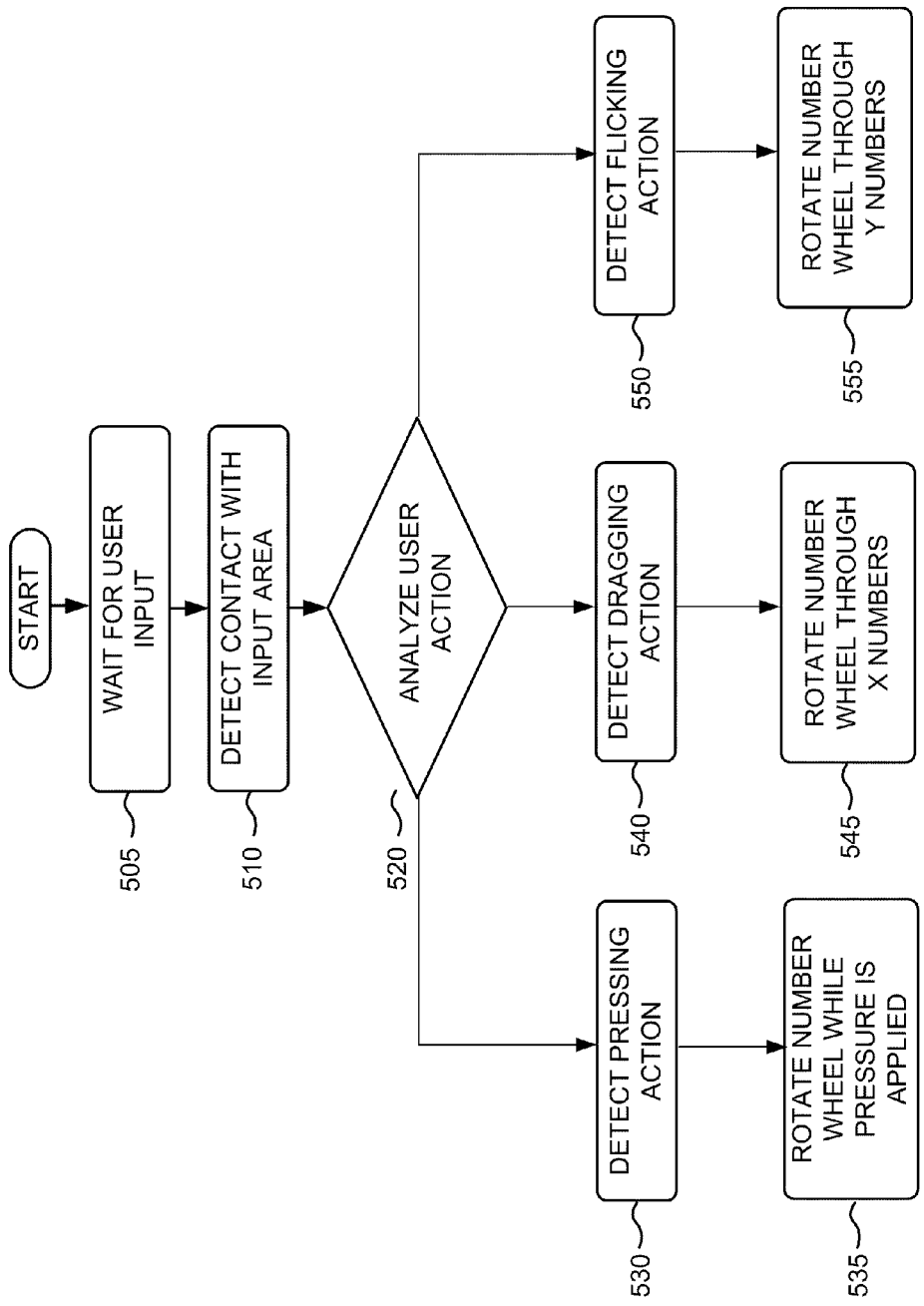
FIG. 5 is a flow graph of an exemplary process for implementing a miniature character input process.

FIG. 5 is a flow diagram illustrating an exemplary process for implementing operation of number wheel 150*e*. The process of FIG. 5 may include with waiting for user input (block 505), and detecting contact with an input area (block 510). The input area may include number wheel 150*e* (corresponding to fields 110*b*, 110*e*, and 110*h*) or areas outside number wheel 150*e* (corresponding to fields 110*a*, 110*c*, 110*d*, 110*f*, 110*g*, and 110*i*). Alternately or additionally, number wheel 150*e* may be controlled by contacting one of the areas outside of number wheel 150*e* (e.g., see item 701 of FIG. 7). Contact with an input area associated with number wheel 150*e* may be detected, for example, by character wheel mechanism 420 when a user touches an input area with a finger or with a pointing device, such as a stylus. In one implementation, touch screen 110 may include a capacitive touch screen and contact with one or more of the fields of touch screen 110 may correspond to a change in capacitance associated with the particular one or more fields.

In response to detecting that the user has contacted an input area associated with number wheel 150*e*, a user action may be analyzed (block 520). For example, character wheel mechanism 420 may determine whether the user is applying continuous pressure, whether a user is dragging in an up direction or a down direction, or whether a user has performed a flicking movement in an up direction or a down direction. Character wheel mechanism 420 may be configured to detect fewer types of user actions or additional user actions.

A pressing action may be detected (block 530). For example, character wheel mechanism 420 may determine that the user is pressing on an input area associated with controlling number wheel 150*e*. Alternately or additionally to other methods of activating number wheel 150*e*, one or more fields, such as field 110*b*, 110*h*, or 110*f* may be configured to activate number wheel 150*e*. In response to detecting a pressing action, number wheel 150*e* may be rotated while pressure is being applied (block 535). For example, character wheel mechanism 420 may keep rotating number wheel 150*e* while pressure is applied.

In one implementation, a user may press on field 110*b*, and while the user is applying pressure on field 110*b*, number wheel 150*e* may rotate upward. If a user presses on field 110*h*, and continues to apply pressure on field 110*h*, number wheel 150*h* may rotate downward. Alternately or additionally, input interface 150 may be implemented to detect pressure to field 110*b* or field 110*h* in touch screen 110. If this functionality is included, a user may rotate number wheel 150*e* upward by applying pressure to field 110*b*, and the user may rotate number wheel 150*e* downward by applying pressure to field 110*h*. Number wheel 150*e* may continue to rotate as long as the user applies pressure. The speed with which number wheel 150*e* rotates may be proportional with the amount of applied pressure. For example, if a user presses with more pressure, number wheel 150*e* may rotate faster.

A dragging (or sliding) action may be detected (block 540). For example, character wheel mechanism 420 may determine that the user is dragging a finger (or a pointing device) across number wheel 150*e*. In response to detecting a dragging action, number wheel 150*e* may be rotated a particular amount in a direction corresponding to the detected dragging action (block 545). For example, if the user drags a finger upward across the number wheel (i.e. from field 110*h* to field 110*b*), character wheel mechanism 420 may rotate number wheel 150*e* upward by two numbers. If the user drags a finger downward across the number wheel (i.e. from field 110*b* to field 110*h*), character wheel mechanism 420 may rotate number wheel 150*e* downward by two numbers.

A dragging motion may be detected across two fields or across three fields. For example, a user may drag a finger from field 110*h* up to field 110*e*, or a user may drag a finger from field 110*h* up to field 110*b*. If the user drags a finger across two fields, number wheel 150*e* may rotate by a first amount (e.g. by one number), and if the user drags a finger across three fields, the number wheel may rotate by a second amount (e.g., by two numbers). The speed with which number wheel 150e rotates may be proportional with the amount of pressure applied during the dragging motion. For example, if a user presses with more pressure during the dragging motion, number wheel 150e may rotate through more numbers.

A flicking action may be detected (block 550). For example, character wheel mechanism 420 may determine that the user is flicking a finger (or a pointing device) across number wheel 150e. Flicking may correspond to the user moving the finger or pointing device with a short, quick movement up or down the number wheel. Flicking may be distinguished from dragging based on speed of the movement. For a movement to be detected as a flicking movement, a user may have to move a finger across input interface 150 with a speed faster than a flick speed threshold. For example, a flick speed threshold may be based on a movement performed within 0.1 second. In response to detecting a flicking motion, number wheel 150e may be moved by a particular amount that is greater than the amount number wheel 150e is moved in response to a dragging motion (block 555). For example, if a dragging motion moves number wheel 150e by two numbers, then a flicking motion may move number wheel 150e by four numbers. The number wheel may move in a direction corresponding to the direction of the flicking motion.

A user may therefore be able to move a character wheel (e.g., number wheel 150e) using three different actions. A user may press a particular field of input interface 150 to cause a character wheel to rotate while pressure is applied, drag a finger up or down the character wheel to cause the character wheel to turn by a first particular degree and flick the character wheel up or down to cause the character wheel to turn by a second particular degree. It is to be understood that the miniature character entry mechanism may be configured for only one of any of these actions to turn a character wheel, two of any of these actions, all three of these actions, or may be configured for additional actions. An example of an additional action that may be used to turn a character wheel may include a tapping action at field 110b or field 110h.

First Exemplary Method of Entering Characters

Figure 6A:
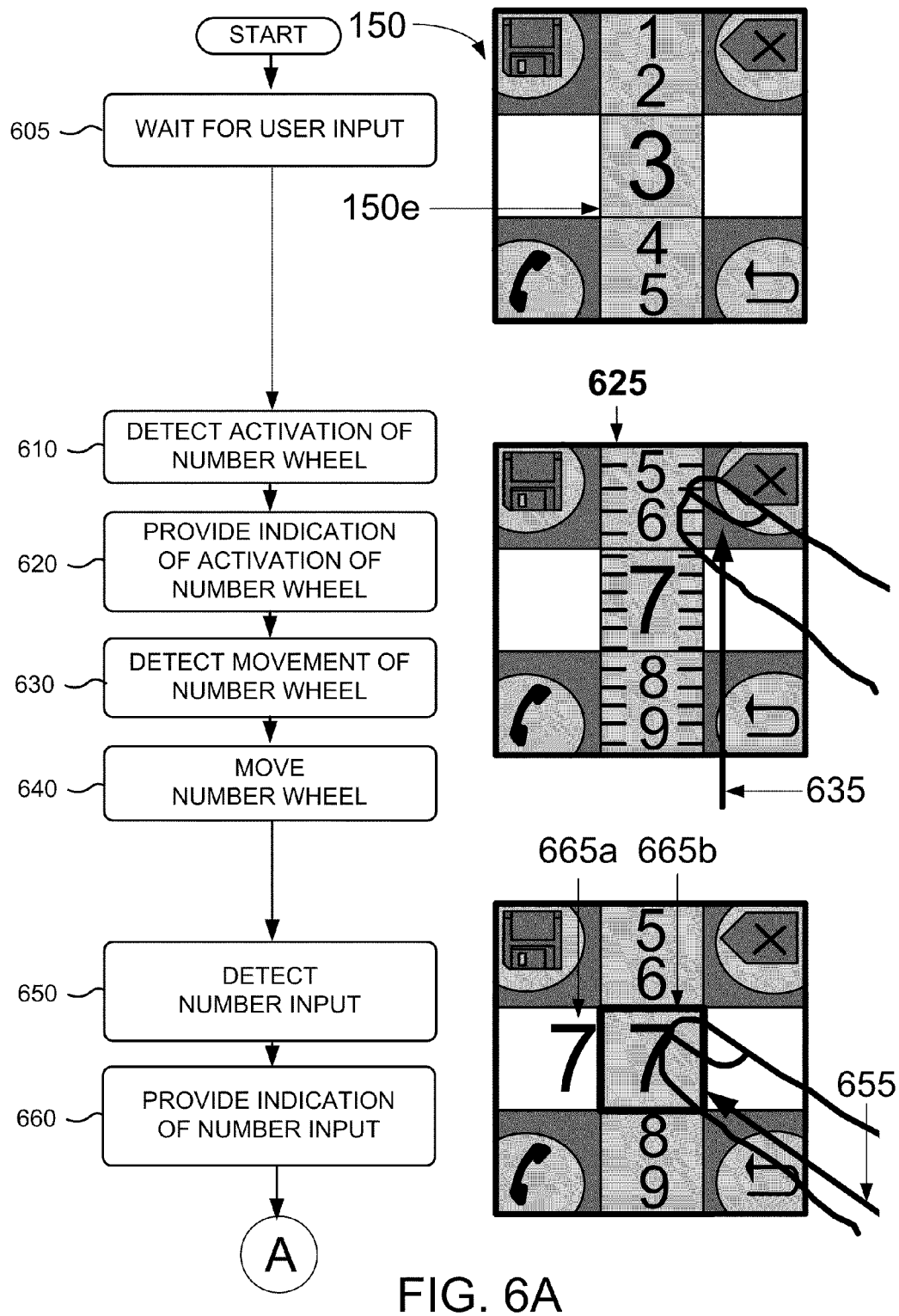
FIGS. 6A and 6B illustrate a flow graph of a first exemplary process for entering characters using a miniature character input mechanism.
Figure 6B:
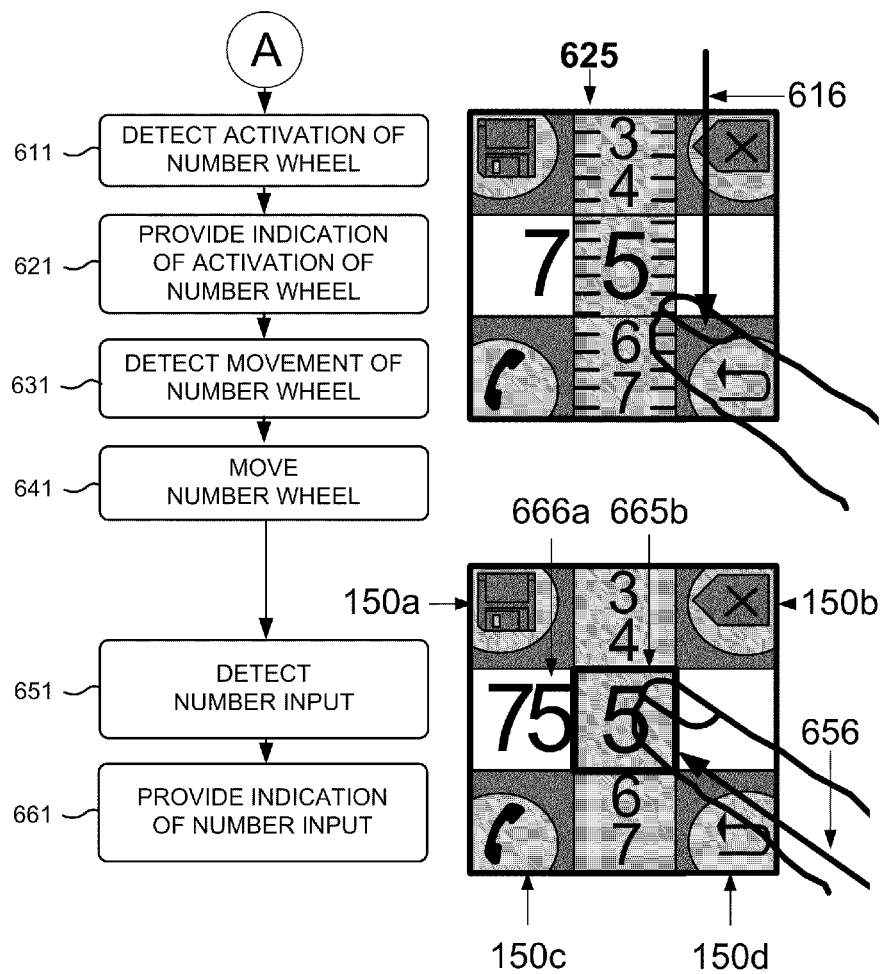

FIGS. 6A and 6B illustrate a flow graph of a first exemplary process for entering characters using a miniature character input mechanism. The process of entering characters illustrated in FIGS. 6A and 6B may be performed with input interface 150. The process of FIG. 6A may include waiting for user input (block 605) and detecting activation of the number wheel (block 610). For example, miniature character input mechanism 400 may detect that a user has touched number wheel 150e. In response to detecting activation of number wheel 150e, an indication of the activation of number wheel 150e may be provided (block 620). For example, character wheel mechanism 420 may alter the appearance of number wheel 150e by the addition of movement indication bars 625 to alert the user that number wheel 150e is rotating. Alternately or additionally, an indication of the activation of number wheel 150e may include an audible indication. Movement of number wheel 150e may be detected (block 630). For example, character wheel mechanism 420 may detect that a user is dragging (or sliding) a finger upward along number wheel 150e (movement arrow 635). In response to detecting movement of number wheel 150e, number wheel 150e may be moved (or scrolled) on display 110.

For example, in response to the user dragging a finger upward, character wheel mechanism 420 may move number wheel 150e from the numeral '3,' which is currently displayed in the center, to numeral '7.'

A number input may be detected (block 650). For example, character wheel mechanism 420 may detect that a user has pressed on the center number of number wheel 150e (i.e. that the user has pressed on field 110e—movement arrow 655). In response to detecting a number input, an indication of the number input may be provided (block 660). For example, character wheel mechanism 420 may display an entered number 665a in input row 150f. In addition, character wheel mechanism 420 may highlight the entered number by using a highlight icon 665b. Alternately or additionally, an indication of the number input may include an audible indication. Highlight icon 665b may include momentarily displaying a border around the pressed number, changing the color, or any other indication.

FIG. 6B which shows the entry of a second number. Another activation of the number wheel may be detected (block 611), which may be followed by another indication of activation of the number wheel (block 621). A movement of the number wheel may be detected (block 631) in response to, in this example, downward movement 616, followed by another movement of the number wheel (block 641). In the example of FIG. 6B, the movement of the number has moved the number wheel from the numeral '7' to the numeral '5.'

Another number input may be detected (block 650) based on a user pressing on, in this example, numeral '5' (movement arrow 656), which may be followed by another indication of the number input provided (block 660). Input row 150f may now display two entered numerals 666a, which in this example are '7' and '5.'

The process illustrated in FIGS. 6A and 6B may continue until the user finishes entering numbers. For example, the user may enter a complete phone number, at which point the user may either store the phone number by pressing save button 150a or place a call using the entered phone number by pressing call button 150c. The user may of course, at any point, also delete entered characters using delete button 150b, or cancel the whole procedure by pressing return button 150d.

Second Exemplary Method of Entering Characters

Figure 7A:
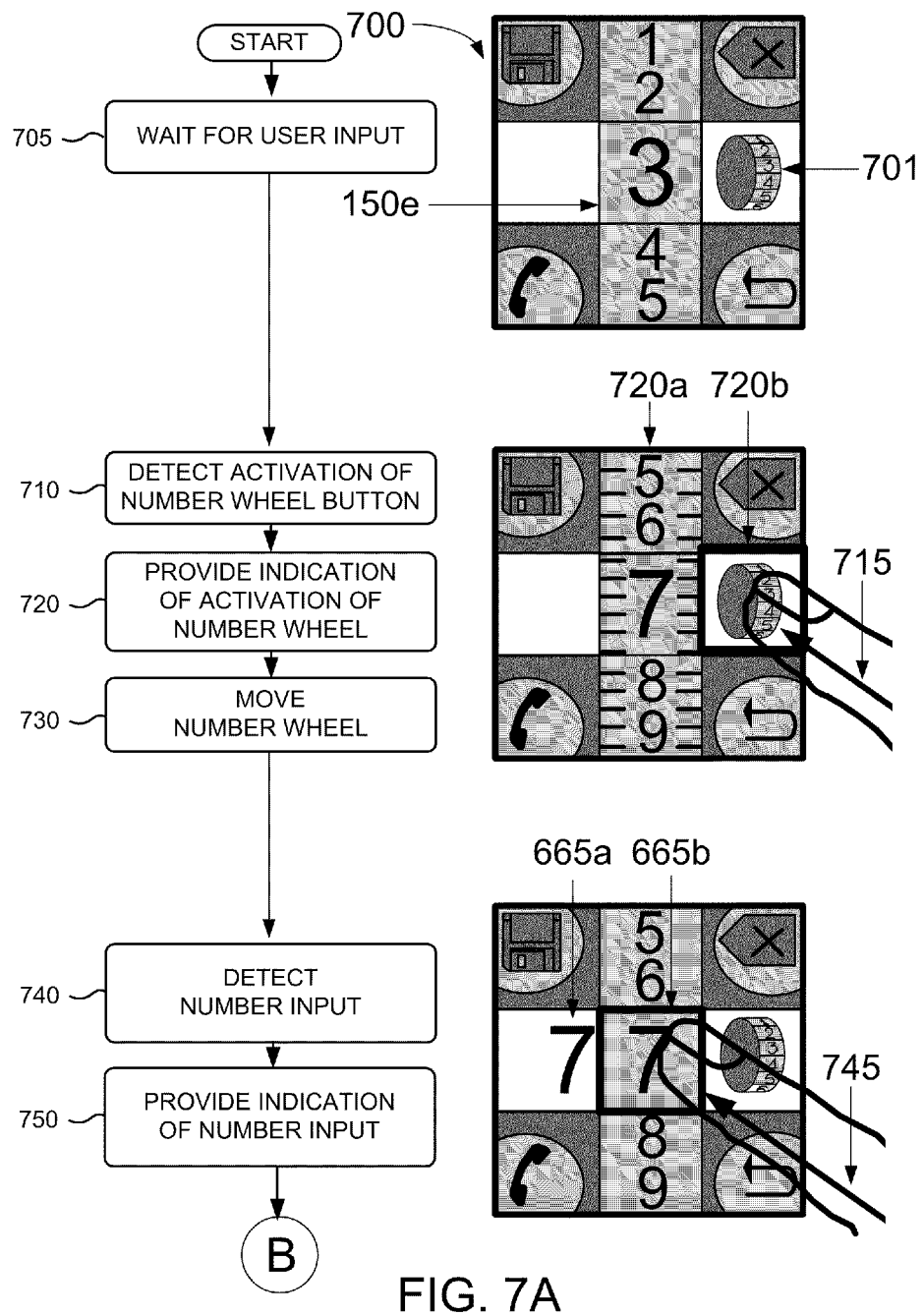
FIGS. 7A and 7B illustrate a flow graph of a second exemplary process for entering characters using a miniature character input mechanism.
Figure 7B:
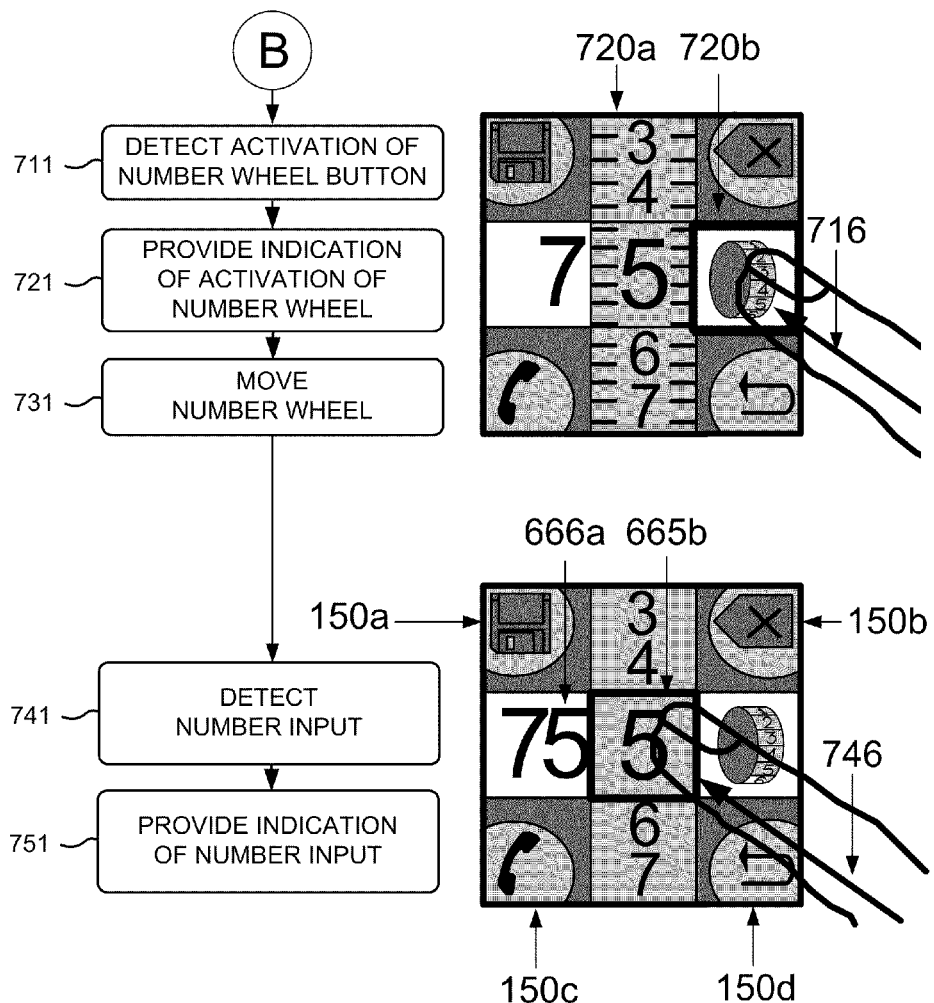

FIGS. 7A and 7B illustrate a flow graph of a second exemplary process for entering characters using a miniature character input mechanism. The process of entering characters illustrated in FIGS. 7A and 7B may be performed with input interface 700. Input interface 700 may differ from input interface 150 in that it may include a number wheel icon 701. Number wheel icon 701 may be located in field 110f of touch screen 110 and may function to activate number wheel 150e. If a user presses on number wheel icon 701, while the user maintains the pressure, number wheel 150e may move.

The process of FIG. 7A may include waiting for user input (block 705) and detecting activation of a number wheel 150e (block 710). For example, miniature character input mechanism 400 may detect that a user has pressed number wheel icon 701 (movement arrow 715). In response to detecting activation of the number wheel, an indication of the activation of the number wheel may be provided (block 720). For example, character wheel mechanism 420 may alter the appearance of number wheel 150e by the addition of movement indication bars 720a to alert the user that number wheel 150e is rotating. Additionally, character wheel mechanism 420 may highlight number wheel icon 701 by changing the number wheel icon 701 to highlighted number wheel icon 720*b* while number wheel icon 701 is being pressed. Highlighted number wheel icon 720*b* may include a border around the icon, a change in color, or any other form of highlighting. Alternately or additionally, an audible indication may be provided.

In response to detecting activation of the number wheel, the number wheel may be moved on display 110 (block 730). The movement of number wheel 150*e* may continue as long as the user is applying pressure to number wheel icon 701. When the user releases pressure from number wheel icon 701, the movement of number wheel 150*e* may stop.

Once the user stops pressing on number wheel icon 701, and the movement of number wheel 150*e* has stopped, a number input may be detected (block 740). For example, character wheel mechanism 420 may detect that a user has pressed on the center number of the number wheel (i.e. that the user has pressed on field 110*e*—movement arrow 745). In response to detecting a number input, an indication of the number input may be provided (block 750). For example, character wheel mechanism 420 may display an entered number 665*a* in input row 150*f*. In addition, character wheel mechanism 420 may highlight the entered number by using a highlight icon 665*b*. Highlight icon 665*b* may include momentarily displaying a border around the pressed number, changing the color, or any other indication.

FIG. 7B which shows the entry of a second number. Another activation of the number wheel may be detected (block 711), in response to the user again pressing number wheel icon 701 (movement arrow 716), which may be followed by another indication of activation of the number wheel (block 721). In response to detecting another activation of the number wheel, the number wheel may be moved again until pressure on number wheel icon 701 is released (block 731). In the example of FIG. 7B, the movement of the number has moved number wheel 150*e* from the numeral '7' to the numeral '5.'

Another number input may be detected (block 741) based on a user pressing on, in this example, numeral '5' (movement arrow 746), which may be followed by another indication of the number input provided (block 751). Input row 150*f* may now display two entered numerals 666*a*, which in this example are '7' and '5.'

The process illustrated in FIGS. 7A and 7B may continue until the user finishes entering numbers. For example, the user may enter a complete phone number, at which point the user may either store the phone number by pressing save button 150*a* or place a call using the entered phone number by pressing call button 150*c*. The user may of course, at any point, also delete entered characters using delete button 150*b*, or cancel the whole procedure by pressing return button 150*d*.

An advantage of the method of inputting characters using input interface 150, as illustrated in FIGS. 6A and 6B, compared to the method of inputting characters using input interface 700, as illustrated in FIGS. 7A and 7B may be that a user may move number wheel 150*e* in both directions using input interface 150, while a user may only be able to move number wheel 150*e* in one designated direction by pressing on number wheel icon 701.

An advantage of the method of inputting characters using input interface 700, as illustrated in FIGS. 7A and 7B, compared to the method of inputting characters using input interface 150, as illustrated in FIGS. 6A and 6B may be that a user may be able to move number wheel 150*e* faster using pressure on number wheel icon 701 compared to repeated dragging motions of number wheel 150*e* of input interface 150. For example, a user may control the speed with which number wheel 150*e* rotates based on the amount of pressure applied to number wheel icon 701.

It should be understood that the method of inputting characters as illustrated in FIGS. 6A and 6B using input interface 150 may also be used with input interface 700, and vice versa. In other words, input interface 700 may also be configured for input using a dragging action, in addition to input using number wheel icon 701, and input interface 150 may also be configured for input using a dragging action, applied at, for example, field 110*b* and 110*h*.

Exemplary Method of Deleting Characters

Figure 8A:
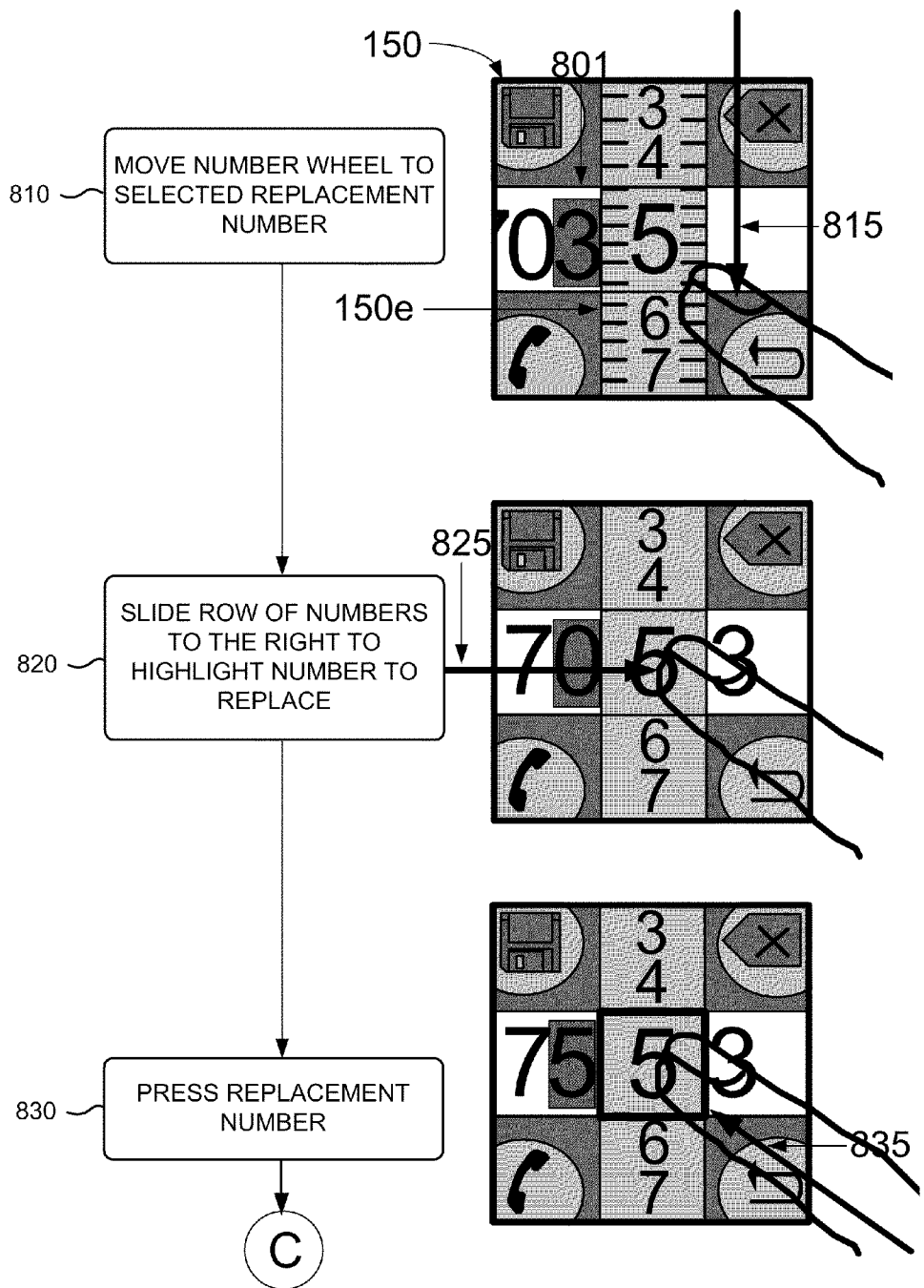
FIGS. 8A and 8B illustrate a flow graph of an exemplary process for editing entered characters using the miniature character input mechanism.
Figure 8B:
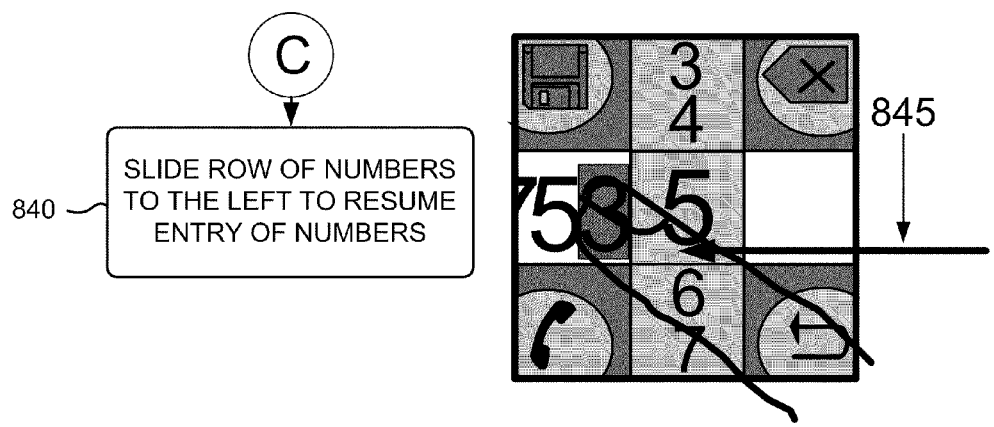

FIGS. 8A and 8B illustrate a flow graph of an exemplary process for deleting characters using a miniature character input mechanism. Alternately or additionally to deleting a character using delete button 150*b*, a user may delete characters by sliding the characters displayed in input row 150*f* to the left. For example, using delete button 150*b*, a user may only be able to delete the last character that was entered. A user may want to replace a character that was entered previously and that is not currently the last character. Assume that the user has entered the numbers '703' as the beginning of a phone number, and the user realizes that the numbers should have been '753'. FIGS. 8A and 8B illustrate an example of replacing the entered numbers '703' with the numbers '753.'

The process of FIG. 8A may begin with moving the number wheel to the selected replacement number (block 810). For example, character wheel mechanism 420 may detect that the user has moved number wheel 150*e* to display the numeral '5' (movement arrow 815). An indication may be provided of which number of the entered numbers is selected for editing. For example, edit mechanism 430 may keep the last entered character as highlighted character 801.

The user may slide the row of characters to the right to highlight the number that is to be replaced (block 820). For example, edit mechanism 430 may detect that a user has contacted input row 150*f* and dragged a finger to the right (movement arrow 825). In response, edit mechanism 430 may slide the row of entered characters to the right. In the example of FIG. 8A, the characters '703' have been moved to the right to highlight character '0'.

The user may press a replacement number to replace the highlighted character (block 830). For example, character wheel mechanism 420 may detect that the user has pressed on numeral '5' currently in the middle of input interface 150 (movement arrow 835), and edit mechanism 430 may replace numeral '0' with numeral '5.'

The user may slide the row of characters back to the left to resume entry of characters (block 840). For example, edit mechanism 430 may detect a dragging action across input field 150*f* to the left, and may replace highlighted replaced character '5' with the character that was entered last, namely the character '3' (movement arrow 845). Input row 150*f* may now display '753' and the user may resume entry of characters.

Third Exemplary Method of Entering Characters

Figure 9:
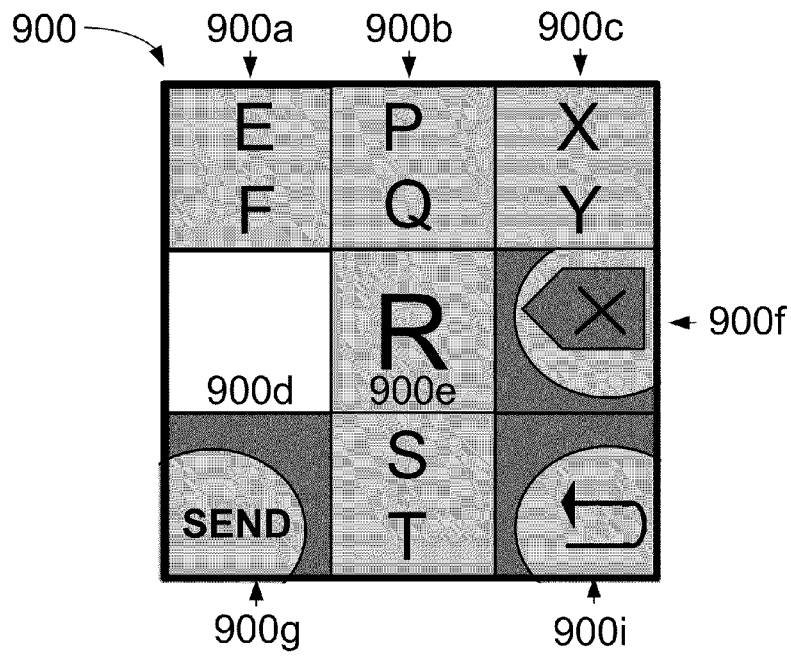
FIG. 9 illustrates an exemplary user interface for entering letters using the miniature character input mechanism.

FIG. 9 illustrates another exemplary input interface 900. Letter input interface 900 may be used for entering characters that include letters using the miniature character input mechanism. Letter input 900 may be provided, for example, when the user of mobile communication device 100 selects to send a text message to a particular recipient. The particular recipient may have been chosen using a different input interface prior to or after entering a message using input interface 900. Letter input interface 900 may include a first letter wheel 900a, a second letter wheel 900b, a third letter wheel 900c, a character display field 900d, a character entry button 900e, a delete button 900f, a send button 900g, and a return button 900i.

First letter wheel 900a, second letter wheel 900b, and third letter wheel 900c may together include all twenty-six letters of the English alphabet, a space symbol, and a few basic punctuation marks. For example, first letter wheel 900a may include letters 'A' through 'J,' second letter wheel 900b may include letters 'K' through 'T,' and third letter wheel 900c may include letters 'U' through 'Z,' a 'space' symbol, and one or more punctuation marks that may include a period, a comma, a question mark, and an exclamation mark. Thus, the alphabet may be divided into three substantially equal sections, each of the three sections represented by one letter wheel.

Character display field 900d may display characters that were entered by the user using the three letter wheels. Character entry button 900e may display the letter currently selected. Pressing on character entry button 900e may enter the character displayed in character entry button 900e and display the entered character in character display 900d.

Delete button 900f may implement a delete function. For example, pressing on delete button 900f may delete the last character that was entered. Send button 900g may send the entered text as a message to a previously determined recipient. Return button 900i may exit letter input interface 900 and return to a previous user interface and/or application.

Letter input interface 900 may allow a user to enter text by manipulating the three letter wheels. The letter wheel that is displayed in the center column of touch screen 110 may be moved (i.e. rotated or scrolled) similarly to number wheel 150e of input interface 150. A user may slide a different letter wheel to the center to access the letters on that particular letter wheel. For example, a user may slide a different letter wheel to the center by dragging a finger across the top row of fields of touch screen 110 (i.e. fields 110a-110c). Once a different letter wheel has been moved to the center, a user may move up and down the letter wheel to select a letter on that letter wheel.

Letter input interface 900 may implement editing functions similar to the editing function depicted in FIG. 8. Namely, a user may slide a row of entered characters, which appear in character display 900d, to the right to select a particular letter to change. The user may then select a replacement letter and slide the row of letters back to the left to resume entry of characters.

Example of Entering Letters Using a Letter Input Interface

Figure 10A:
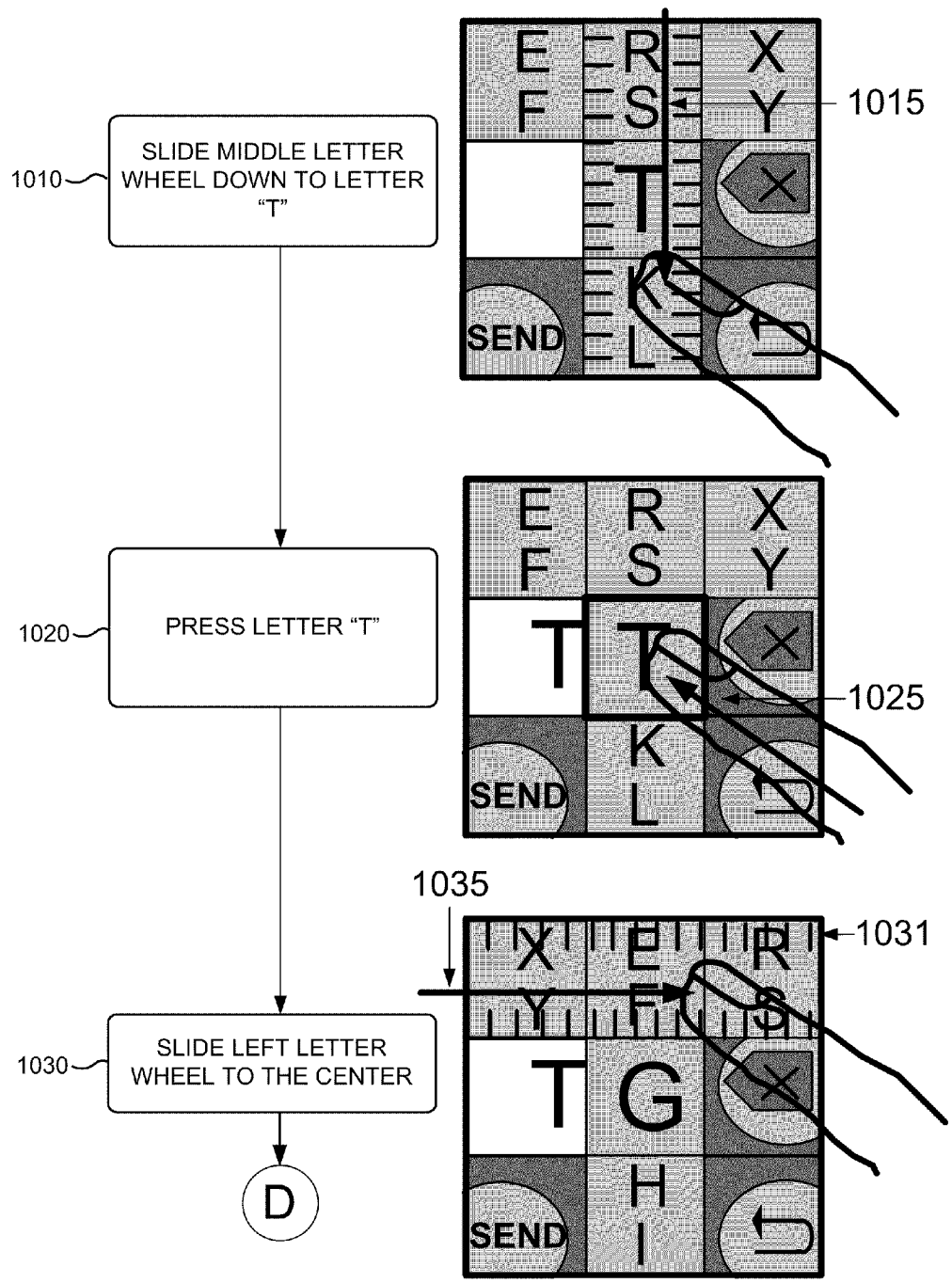
FIGS. 10A and 10B illustrate a flow graph of an exemplary process for entering characters using the letter input interface depicted in FIG. 9.
Figure 10B:
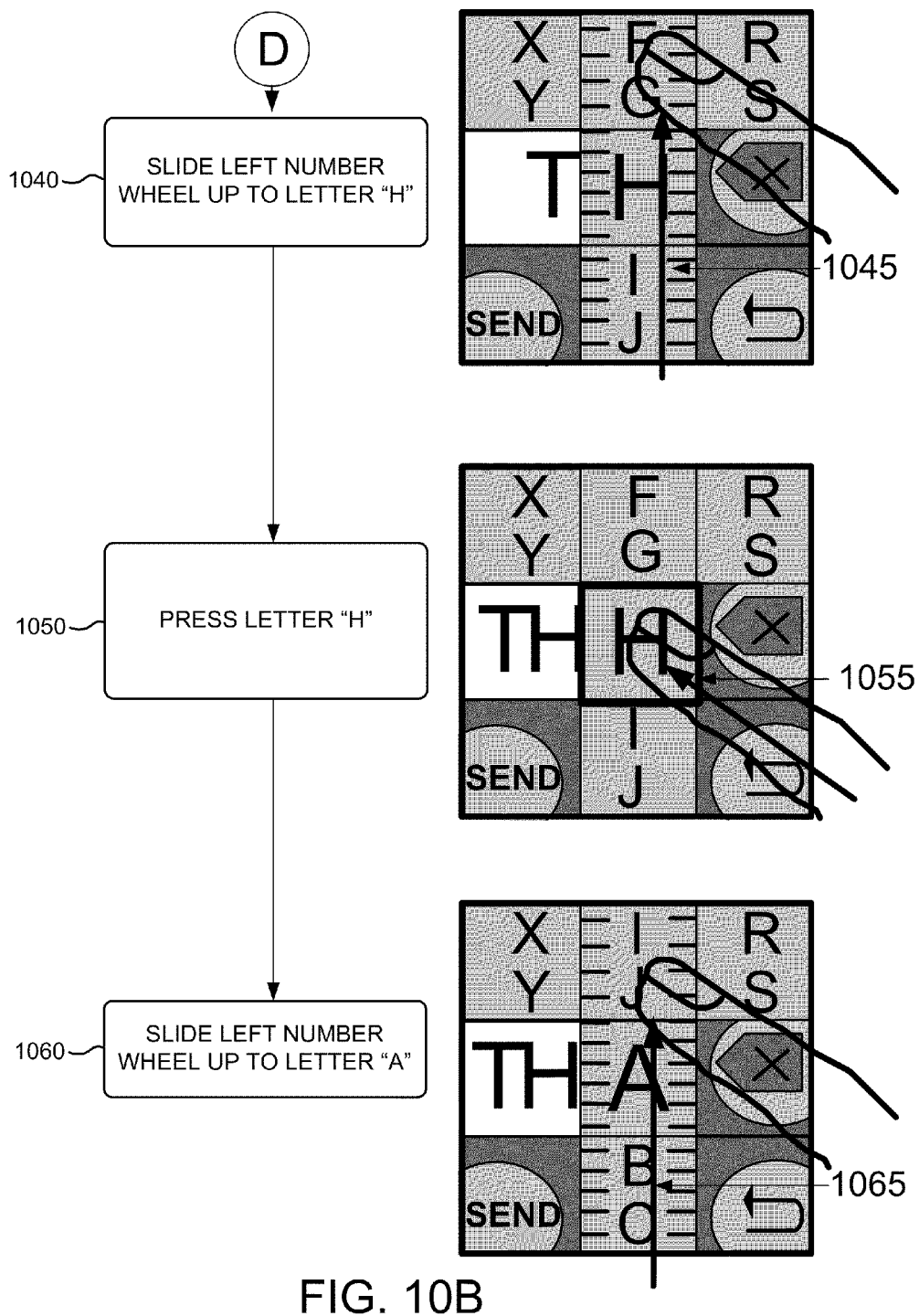

FIGS. 10A and 10B illustrate a flow graph of an exemplary process for entering characters using the letter input interface of FIG. 9. The example illustrated in FIGS. 10A and 10B depicts how a user would enter the first three letters of the word "thanks."

The processing of FIG. 10A may begin with a user dragging (or sliding) the middle letter wheel, which may include the letter 'T' downward to position the letter 'T' in the middle of letter input interface 900 (block 1010, movement arrow 1015). In response, character wheel mechanism 420 may detect the user's movement and provide an indication of the movement of second letter wheel 900b. The user may press the letter 'T' (block 1020, movement arrow 1025). In response, character wheel mechanism 420 may display the letter 'T' in character display field 900d.

To enter the second letter of the word "thanks," a user may drag horizontally across the top row of letter input interface 900, thereby sliding the left letter wheel (i.e. first letter wheel 900a) to the center (block 1030, movement arrow 1035). In response, character wheel mechanism 420 may detect the user's movement and provide an indication of the movement of first letter wheel 900a to the center. The indication may include horizontal movement indication bars 1031 similar to movement indication bars 720a. Alternately or additionally, an indication of the horizontal movement of a letter wheel may include an audible indication. The other two letter wheels may be rotated to the right. Namely, second letter wheel 900b, which was previously in the center, may be moved to the right column, and third letter wheel 900c, which was previously at the right, may be moved to the left column. For example, character wheel mechanism 420 may display second letter wheel 900b in field 110c of touch screen 110 and display third letter wheel 900c in field 110a of touch screen 110.

A user may drag the middle letter wheel, which is now first letter wheel 900a, upward to select the next letter of the word, which in this case may be the letter 'H' (block 1040, movement arrow 1045). In response, character wheel mechanism 420 may detect the user's movement and provide an indication of the movement of first letter wheel 900a. The user may press the letter 'H' (block 1050, movement arrow 1055). In response, character wheel mechanism 420 may display the letter 'H' in character display field 900d after the already displayed letter 'T.'

To enter the next letter of the word, the user may not need to select a different letter wheel, since the next letter of the word, the letter 'A,' is on the same letter wheel as the previous letter. Thus, the user may only need to slide the middle letter wheel, currently first letter wheel 900a, upward to position letter 'A' in the middle (block 1060, movement arrow 1065). In response, character wheel mechanism 420 may detect the user's movement and provide an indication of the movement of first letter wheel 900a. The user may then press letter 'A' to input this letter, and the letter may be displayed in character display field 900d (not shown). This process may be repeated until a user has entered the desired message, a which point the user may press send button 900g to send the message (not shown).

CONCLUSION

Implementations described herein may provide a miniature character input mechanism for entering characters, such as when entering a phone number, in a device with a touch screen small enough to accommodate a grid of three-by-three (e.g., nine) simultaneous touch areas. As an example, such a miniature character input mechanism may be incorporated in a small and stylish mobile phone, which may give priority to a small size over functionality. As another example, a miniature character input mechanism may be implemented in a device with multiple small parts, such as a mobile communication device with a headset and accessory cord, where the miniature character input mechanism may be implemented using a small control box located on the accessory cord.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 5, 6A-6B, 7A-7B, 8A-8B, and 10A-

10B, the order of the blocks may be modified in other implementations. Further, non-dependent blocks may be performed in parallel.

Furthermore, it is to be understood that other user interfaces within the scope of the systems and methods described herein may be provided. Any input interface that utilizes a wheel of characters may be provided. For example, a single character wheel of letters may be provided, instead of three separate wheels of letters. In other words, number wheel 150*e* may be replaced with a single wheel of letters of the alphabet, or number wheel 150*e* may incorporate letters of the alphabet. Furthermore, while input interface 900 includes three letter wheels, any number of letter wheels may be implemented. In other words, an alphabet, such as the English alphabet, may be sub-divided into any number of subsets, each subset being represented on a distinct letter wheel.

Moreover, a character wheel as described herein should not be construed as being limited to Roman numerals and English letter characters. Any set of characters may be employed, such any existing alphabet or set of symbols.

Additionally, while entry of characters has been described in terms of pressing on the character that appears in the middle of a character wheel (i.e. field 110*e* of touch screen 110), other fields of touch screen 110 may be used for character entry. For example, the appearance of number wheel 150*e* may be altered to display a single number in field 110*b* of touch screen 110, a single number in field 110*e* of touch screen 110, and a single number in field 110*h* of touch screen 110. For example, field 110*b* may display the numeral '1,' field 110*e* may display the numeral '2,' and field 110*h* may display the numeral '3,' and pressing on any of fields 110*b*, 110*e*, or 110*h* may enter the numeral displayed on the corresponding field into input row 150*f*.

Still further, aspects have been mainly described in the context of a mobile communication device. As discussed above, the device and methods described herein may be used with any type of device that includes an input device. It should also be understood that particular materials discussed above are exemplary only and other materials may be used in alternative implementations to generate the desired information.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A device, comprising:
   a touch screen: and
   logic configured to:
   display an input interface on the touch screen, wherein the input interface includes a scrollable character wheel,
   distinguish between a first type of input motion and a second type of input motion,
   scroll the scrollable character wheel by a first number of characters in response to detecting the first type of input motion,
   scroll the scrollable character wheel by a second number of characters in response to detecting the second type of input motion,
   receive a selection of a character from the character wheel, and
   display the selected character on the input interface, in response to receiving the selection.

2. The device of claim 1, wherein the input interface further includes control buttons, wherein the control buttons comprise one or more of
   a save button that saves selected characters in a memory,
   a delete button that deletes a last character of the selected characters,
   a call button that places a call using the selected characters, and
   a return button that terminates display of the input interface.

3. The device of claim 1, wherein the input interface comprises a three by three grid of input fields.

4. The device of claim 1, wherein the scrollable character wheel includes characters of a telephone keypad.

5. The device of claim 1, wherein the receiving one or more selections of characters include:
   detecting a scrolling up or down of the scrollable character wheel to position a character in a particular location; and
   detecting a pressing action on the character in the particular location.

6. The device of claim 1, wherein the first type of input motion includes a dragging motion and the second type of input motion includes a flicking motion.

7. The device of claim 1, wherein the logic is further configured to:
   continue to scroll the scrollable character wheel while pressure is being applied to the scrollable character wheel.

8. The device of claim 1, wherein the logic is further configured to:
   detect a selection of a displayed character to edit, based on a horizontal dragging motion associated with the displayed character.

9. The device of claim 1, wherein the scrollable character wheel comprises one or more character wheels, and where each of the one or more character wheels includes a subset of letters of an alphabet.

10. The device of claim 1, wherein the device comprises a mobile communication device.

11. A method performed by an electronic device, the method comprising:
    providing, by a processor of the electronic device, a user interface on a touch screen of the electronic device, where the user interface includes a scrollable character wheel;

detecting by the processor, an input action via the scrollable character wheel;

determining, by the processor, whether the detected input action corresponds to a first type of input action or a second type of input action:

scrolling, by the processor, the scrollable character wheel by a first number of characters in response to determining that the input action corresponds to the first type of input action;

scrolling, by the processor, the scrollable character wheel by a second number of characters, in response to determining that the input action corresponds to the second type of input action;

receiving, by the processor, a selection of a character from the scrollable character wheel; and displaying, by the processor, the selected character in the user interface, in response to receiving the selection.

12. The method of claim 11, wherein the receiving a selection of a character comprises:

detecting a scrolling up or down of the scrollable character wheel to position a character in a particular location; and detecting a pressing action on the character in the particular location.

13. The method of claim 1, wherein the first type of input motion includes a dragging motion and the second type of input motion includes a flicking motion.

14. The method of claim 11, wherein the receiving a selection of a character and displaying the selected character are repeated multiple times to input a phone number into the electronic device.

15. The method of claim 14, wherein the user interface includes a call button, the method further comprising:

detecting a selection of the call button; and placing a telephone call using the entered phone number.

16. The method of claim 11, wherein the receiving a selection of a character and displaying the selected character are repeated multiple times to display a set of displayed character, the method further comprising:

detecting a first horizontal dragging action associated with the displayed set of characters;

detecting a selection of one of the displayed set of characters;

detecting a selection of a character from the scrollable character wheel to replace the selected one of the displayed set of characters; and detecting a second horizontal dragging action to resume entry of characters.

17. The method of claim 11, wherein the user interface includes a maximum of nine distinct touch areas.

18. The method of claim 11, wherein the scrollable character wheel comprises multiple letter wheels, each of the multiple letter wheels including a subset of characters of an alphabet, the method further comprising:

detecting a horizontal dragging motion to select one of the letter wheels, the selected letter wheel becoming the scrollable character wheel.

19. The method of claim 11, wherein the user interface includes a character wheel icon and where receiving the selection of a character comprises:

detecting a pressure applied to the character wheel icon;

moving the scrollable character wheel while the pressure is applied to the character wheel icon;

detecting that the pressure is no longer applied to the character wheel icon;

stopping movement of the scrollable character wheel when the pressure is no longer applied to the character wheel icon; and detecting a pressing action on a character located in a particular position of the scrollable character wheel.

20. A non-transitory computer-readable medium containing instructions executable by one or more processors of an electronic device, the non-transitory computer readable medium comprising:

one or more instructions to provide a user interface on a touch screen of the electronic device, where the user interface includes a scrollable character wheel and a call button;

one or more instructions to detect an input action via the scrollable character wheel:

one or more instructions to determine whether the detected input action corresponds to a first type of input action or a second type of input action;

one or more instructions to scroll the scrollable character wheel by a first number of characters, in response to determining that the input action corresponds to the first type of input action;

one or more instructions to scroll the scrollable character wheel by a second number of characters, in response to determining that the input action corresponds to the second type of input action:

one or more instructions to detect a pressing action on a selected character on the scrollable character wheel; and one or more instructions to display the selected character in the user interface.

* * * * *